United States Patent [19]

Kageyama et al.

[11] Patent Number: 5,295,552
[45] Date of Patent: Mar. 22, 1994

[54] SLIP CONTROL SYSTEM FOR MOTOR VEHICLE

[75] Inventors: Fumio Kageyama; Makoto Kawamura, both of Hiroshima; Toshiaki Tsuyama, Higashi-Hiroshima; Haruki Okazaki, Hiroshima, all of Japan

[73] Assignee: Mazda Motor Corporation, Hiroshima, Japan

[21] Appl. No.: 40,962

[22] Filed: Mar. 31, 1993

[30] Foreign Application Priority Data

Mar. 31, 1992 [JP] Japan .................................. 4-078000
Mar. 31, 1992 [JP] Japan .................................. 4-078001

[51] Int. Cl.⁵ ........................ B60T 8/32; B60K 28/16
[52] U.S. Cl. ............................. 180/197; 188/181 R; 303/103; 303/93; 303/100; 364/426.02; 364/426.03
[58] Field of Search ............... 180/197; 303/100, 102, 303/103, 93, 105–110; 364/426.03, 426.02, 426.01, 431.01, 424.1, 424.05; 192/1.23, 1.22, 1.24; 188/181 A, 181 R

[56] References Cited

U.S. PATENT DOCUMENTS 4,946,015  8/1990  Browalski .
5,193,888  3/1993  Okazaki et al. .................... 303/93
5,222,570  6/1993  Kawamura et al. ............... 180/197

FOREIGN PATENT DOCUMENTS 3-109161  5/1991  Japan .

Primary Examiner—Douglas C. Butler
Attorney, Agent, or Firm—Keck, Mahin & Cate

[57] ABSTRACT

A slip control system for a motor vehicle controls respective braking forces in right and left driving wheels and controls an engine output by controlling a throttle opening of a throttle valve so that a slip value of the driven wheel becomes less than a target slip value. The system includes a device providing a basic control amount of the throttle opening based on the slip value of the driven wheel and the target slip value, a device for detecting respective brake fluid pressures in the right and left driven wheels, a device for converting the detected brake fluid pressure into an engine output, a device for providing a correction control amount of the throttle opening by subtracting an amount of the throttle opening corresponding to the converted engine output from the basic control amount of the throttle opening, and a device for driving the throttle valve by the basic control amount of the throttle opening when the brake fluid pressures in the right and left driven wheels are increased or increased rapidly, and driving the throttle valve by the correction control amount of the throttle opening when the brake fluid pressures in the right and left driven wheels are not increased or increased rapidly.

10 Claims, 7 Drawing Sheets

SLIP CONTROL SYSTEM FOR MOTOR VEHICLE

BACKGROUND OF THE INVENTION

1. Field of the Invention

The present invention relates to a slip control system of a motor vehicle, in particular to a slip control system in which slips in driven wheels are controlled by operations of braking force control and engine output control.

2. Description of the Related Art

There is known a conventional slip control system for a motor vehicle which prevents a decrease in acceleration ability caused by the slip which is caused by an excessive driving torque of the driving wheel in an accelerating operation and the like. In order to do so, such slip control system detects a slip value of the driven wheel and controls an engine output and braking force so that the slip value of the driven wheel becomes less than a target slip value which is provided based on friction coefficient of the road surface. The engine output is decreased by the engine output control and the braking force is increased by the braking force control. In the engine output control, a throttle opening in a throttle valve of an engine is controlled.

On the other hand, since a responsibility of the braking force control is larger than that of the engine output control in the slip control system, a brake device absorbs large energy so as to overcome the excessive driving torque of the engine. As a result, the frequent brake force control under high load conditions causes a decrease in the liability of the brake device and vibration of the motor body. Therefore, it has been demanded that amount and time of the engine torque to be absorbed by the brake device should be as small as possible.

Japanese Patent Laid-Open Publication No. 3-109161 discloses a slip control system for a motor vehicle which can solve the above-mentioned problems. Such slip control system detects the sum of the braking pressures in both right and left driving wheels by estimating braking pressures in both right and left driven wheels, and decreases the engine output by amount thereof corresponding to the sum of the braking pressures in the driven wheels so that the load in the brake device is decreased.

However, if the engine output is decreased by the amount thereof corresponding to the sum of the braking pressure in the both right and left driven wheels as shown in the above Patent Publication when the slips in the driven wheels are increased rapidly, the throttle valve is closed too much which causes some problems such as the engine being stalled when the slip is recovered and acceleration being delayed.

On the other hand, in a cold district, the vehicle often runs on so called split road whose friction coefficients against both right and left driven wheels are different each other. In such cases, if the engine output is decreased by the amount thereof corresponding to the sum of the braking pressure in the both driven wheels as shown in the above Patent Publication, even though one driven wheel has enough grip force against the road surface, driving torques in both if one and other driven wheels are decreased. As a result, starting ability and acceleration ability is decreased.

SUMMARY OF THE INVENTION

It is therefore an object of the present invention to provide a slip control system for a motor vehicle in which the load in the brake device can be decreased and the acceleration being delayed can be prevented which is caused by throttle valve being closed too much.

It is another object of the present invention to provide a slip control system for a motor vehicle which can improve the starting ability and acceleration ability when the vehicle runs on a so called split road.

These and other objects are achieved according to the present invention by providing a slip control system for a motor vehicle controlling respective braking forces in right and left driving wheels and controlling an engine output by controlling a throttle opening of a throttle valve so that a slip value of the driven wheel becomes less than a target slip value, said system comprising, means for providing a basic control amount of the throttle opening based on the slip value of the driven wheel and the target slip value, means for detecting respective brake fluid pressures in the right and left driven wheels, means for converting the detected brake fluid pressure into an engine output, means for providing a correction control amount of the throttle opening by subtracting an amount of the throttle opening corresponding to the converted engine output from the basic control amount of the throttle opening, and means for driving the throttle valve by the basic control amount of the throttle opening when the brake fluid pressures in the right and left driven wheels are increased or increased rapidly, and driving the throttle valve by the correction control amount of the throttle opening when the brake fluid pressures in the right and left driven wheels are not increased or increased rapidly.

These and other objects are also achieved according to the present invention by providing a slip control system for a motor vehicle controlling braking force in right and left driven wheels and controlling an engine output by controlling a throttle opening of a throttle valve so that a slip value of the driven wheel becomes less than a target slip value, said system comprising, means for providing a basic control amount of the throttle opening based on the slip value of the driven wheel and the target slip value, means for detecting brake fluid pressure in the right and left driven wheels, means for converting an lower one of the detected brake fluid pressures in the right and left driven wheels into an engine output, means for providing a correction control amount of the throttle opening by subtracting an amount of the throttle opening corresponding to the converted engine output from the basic control amount of the throttle opening, and means for driving the throttle valve by the correction control amount of the throttle opening.

The above and other objects and features of the present invention will be apparent from the following description by taking reference with accompanying drawings employed for preferred embodiments of the present invention.

DESCRIPTION OF THE PREFERRED EMBODIMENTS

The present invention will now be explained with reference to the preferred embodiments and the drawings.

Figure 1:
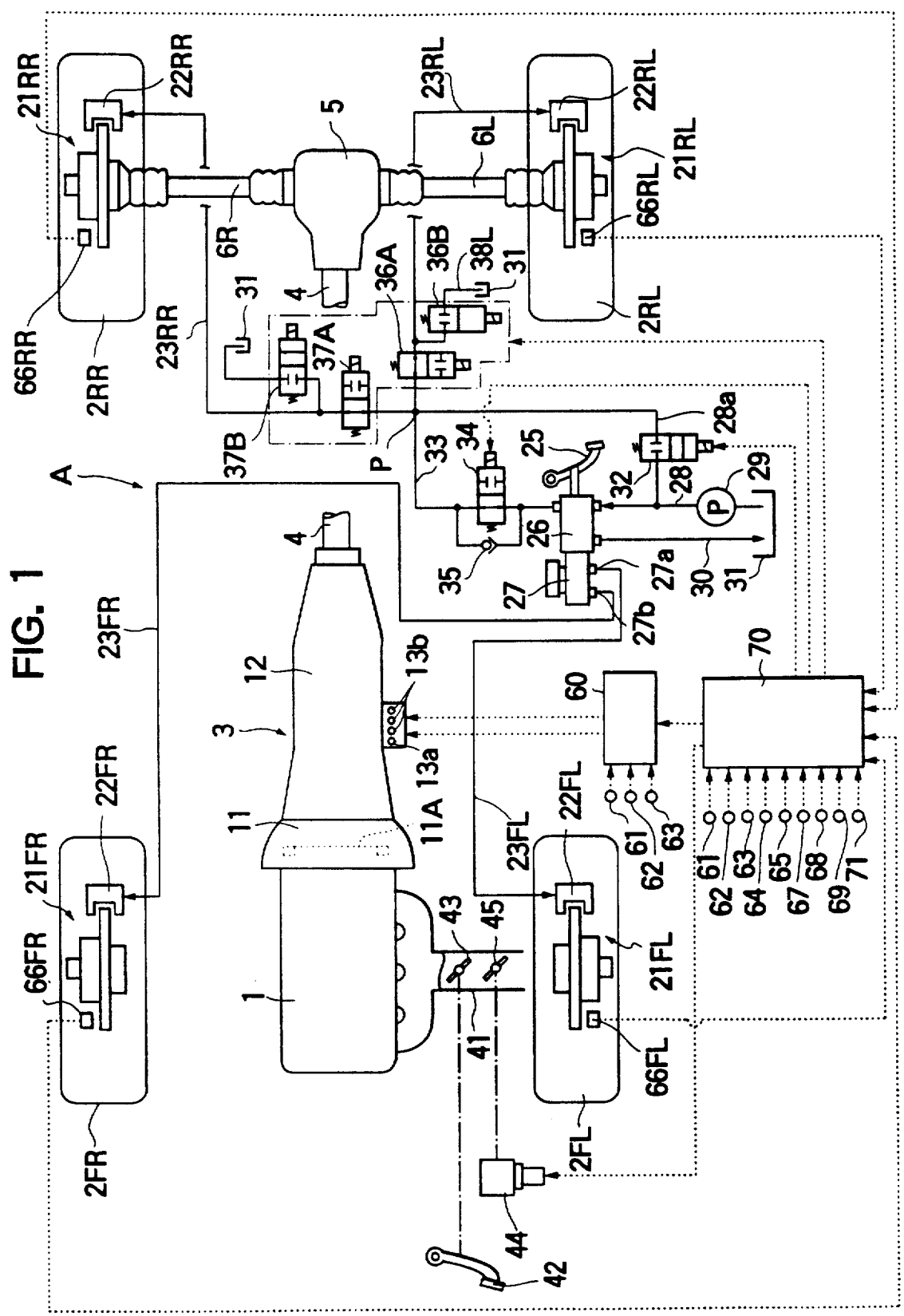
FIG. 1 is a general diagram of a slip control system for a motor vehicle in accordance with the present invention.

FIG. 1 is a general diagram of a slip control system for a motor vehicle in accordance with the present invention. Referring to FIG. 1, there is shown a motor vehicle having right and left front wheels 1FR, 1FL for nondriven wheels, right and left rear wheels 1RR, 1RL for driven wheels, and a slip control unit 70 which carries out a brake control and an engine control for controlling the slip values in the driven wheels 1RR, 1RL, and which also carries out a lockup control through an automatic transmission controller 60.

The vehicle includes an engine 2 disposed in the front portion thereof. A torque generated by the engine 2 is transmitted to the right rear wheel 2RR through an automatic transmission 3, a propeller shaft 4, a differential gear 5 and a right diving shaft 6R and transmitted to the left rear wheel 2RL through the automatic transmission 3, the propeller shaft 4, the differential gear 5 and a left diving shaft 6L.

The automatic transmission 3 comprises a fluid torque converter 11 and a multiple-stage transmission gear mechanism 12. The transmission gear mechanism 12 is operated by hydraulic pressure and includes four forward stages and one backward stage. That is, the transmission gear mechanism 12 is operated by selecting combinations of magnetization and/or demagnetization of a plurality of solenoids 13a which are incorporated in a hydraulic control circuit for the automatic transmission 3. The torque converter 11 is provided with a lockup clutch 11a operated by hydraulic pressure whose connection and disconnection is carried out by selecting magnetization or demagnetization of a solenoid 13b incorporated in the hydraulic control circuit.

The solenoids 13a, 13b are controlled by the AT controller 60 for the automatic transmission 3. The AT controller stores transmission characteristics and lockup characteristics and in accordance with these characteristics carries out the transmission and lockup controls. In order to carry out these control operations, a main throttle opening signal from a main throttle sensor 61 detecting an opening of a main throttle valve 43, a sub throttle opening signal from a sub throttle sensor 62 detecting an opening of a sub throttle valve 45, and a vehicle speed signal from a vehicle speed sensor 63 detecting a rotation speed of the propeller shaft 4 are input to the AT controller 60.

Brake Fluid Pressure Adjustment Mechanism

Brakes 21FR, 21FL, 21RR and 2RL are provided respectively in wheels 1FR, 1FL, 1RR and 1RL. Brake fluid pressure is supplied to respective calipers (wheel cylinders) 22FR, 22FL, 22RR and 22RL of the brakes 21FR, 21FL, 21RR and 21RL through respective brake conduits 23FR, 23FL, 23RR and 23RL. The calipers 22RR, 22RL in the driven wheels 2RR, 2RL are respectively provided with brake pressure sensors 64, 64 estimating the brake pressure therein.

Supply of the brake fluid pressure to the respective brakes 21FR, 21FL, 21RR and 21RL is carried out as follows. First, braking force on a brake pedal 25 is boosted by a hydraulic booster 26 and transmitted to a tandem type cylinder 27. A first discharge outlet 27a of the master cylinder 27 is connected to the brake conduit 23FL for the left front wheel, and a second discharge outlet 27b of the cylinder 27 is connected to the brake conduit 23FR for the right front wheel.

Fluid is supplied through a conduit 28 by a pump 29 to the booster 26, and the excessive fluid in the booster 26 is returned back to a reservoir 31 through a conduit 30. A branch conduit 28a is branched from the conduit 28 is connected to a junction point P and provided with a solenoid switching valve 32. The boosted fluid pressure in the booster 26 is supplied to the junction point P through a conduit 33 with a solenoid switching valve 34. The conduit 33 is further provided in parallel to the switching valve 34 with a one way valve 35 which permits the fluid to flow toward the junction point P. To the junction point P, the brake conduits 23RR, 23RL are connected. The brake conduits 23RR, 23RL are respectively provided with solenoid switching valves 37A, 36B and further provided with solenoid switching valves 37B, 36B on relief conduits 38R, 38L connected to the down stream portion of the switching valves 37A, 36A.

The above-mentioned respective switching valves 32, 34, 36A, 37A, 36B and 37B are controlled by the slip control unit 70. Namely, when the brake control operation for the slip control is not carried out, as shown in FIG. 1, the switching valve 32 is closed and the switching valve 34 is opened, and further the switching valves 36A, 36B are opened and the switching valves 36B, 37B are closed. As a result, when the brake pedal 25 is operated, the brake fluid pressure is supplied to the brakes 21FR, 21FL for the front wheels 1FR, 1FL through the master cylinder 27 and is supplied to the brakes 21RR, 21RL for the rear wheels 1RR, 1RL through the conduit 33 of the booster 26 in accordance with the operational force on the brake pedal 25.

When the brake control operation for the slip control explained below is carried out, the switching valve 34 is closed and the switching valve 32 is opened. A duty control on the switching valves 36A, 36B (37A, 37B) are carried out so as to maintain, increase or decrease the brake fluid pressure. Namely, under the condition of the switching valve 2 being closed, the brake fluid pressure is maintained by the switching valves 36A, 36B, 37A and 37B being closed, and is increased by the switching valve 36A (37A) being opened and the switching valve 36B (37B) being closed, and is decreased by the switching valve 36A (37A) being closed and the switching valve 36B (37B) being opened. The one way valve 35 is provided so that the brake fluid pressure from the branch conduit 28a does not work as a reaction force to the brake pedal 25.

When the brake control operation for the slip control is being carried out and then the brake pedal 25 is operated, the brake fluid pressure of the booster 26 corresponding to the operational force on the brake pedal 25 is supplied through the one way valve 35 to the brakes 21RR, 21RL for the rear wheels 1RR, 1RL.

Engine Output Adjustment Mechanism

The slip control unit 70 carries out not only the brake control operation by which the driving torque applied to the driven or rear wheels 2RR, 2RL is decreased, but also the engine control operation by which the torque generated by the engine 1 is decreased. For the engine control, in an intake passage 41 is disposed a main throttle valve 43 operatively connected to an accelerator pedal 42 and a sub throttle valve 45 operatively connected to an actuator 44 for adjusting an throttle opening. The sub throttle valve 45 is controlled by the slip control unit 70 through the actuator 44. In this case, because the main throttle valve 43 and the sub throttle valve 45 are disposed in series, the throttle opening is determined by whichever throttle valve is opened least.

Slip Control Unit

To the slip control unit 70 is input signals of throttle opening sensors 61, 62 and a vehicle speed sensor 63. In addition, various other signals are input, such as those of brake fluid pressure sensors 64, 65 detecting respective brake fluid pressures in the driven wheels 2RR, 2RL, those of wheel rotation speed sensors 66FR, 66FL, 66RR and 66RL detecting respective wheel rotation speeds in the wheels 2FR, 2FL, 2RR and 2RL, that of an acceleration opening sensor 67 detecting the acceleration pedal operational amount, that of an gear position sensor 68 detecting the gear position in the automatic transmission, that of an steering angle sensor 69 detecting the steering angle of a steering wheel, and that of an manual selection switch 71 by which various modes are selected manually by a driver.

The slip control unit 70 is provided with an input interface for receiving the signals from each of the above sensors, a microcomputer having a CPU, a ROM and a RAM, an output interface, and a drive circuit for driving the valves 32, 34, 36A, 36B, 37A, 37B and the actuator 44. Programs necessary for the slip control and various maps are stored in the ROM. Various memories necessary for the slip control are stored in the RAM.

Figure 2:
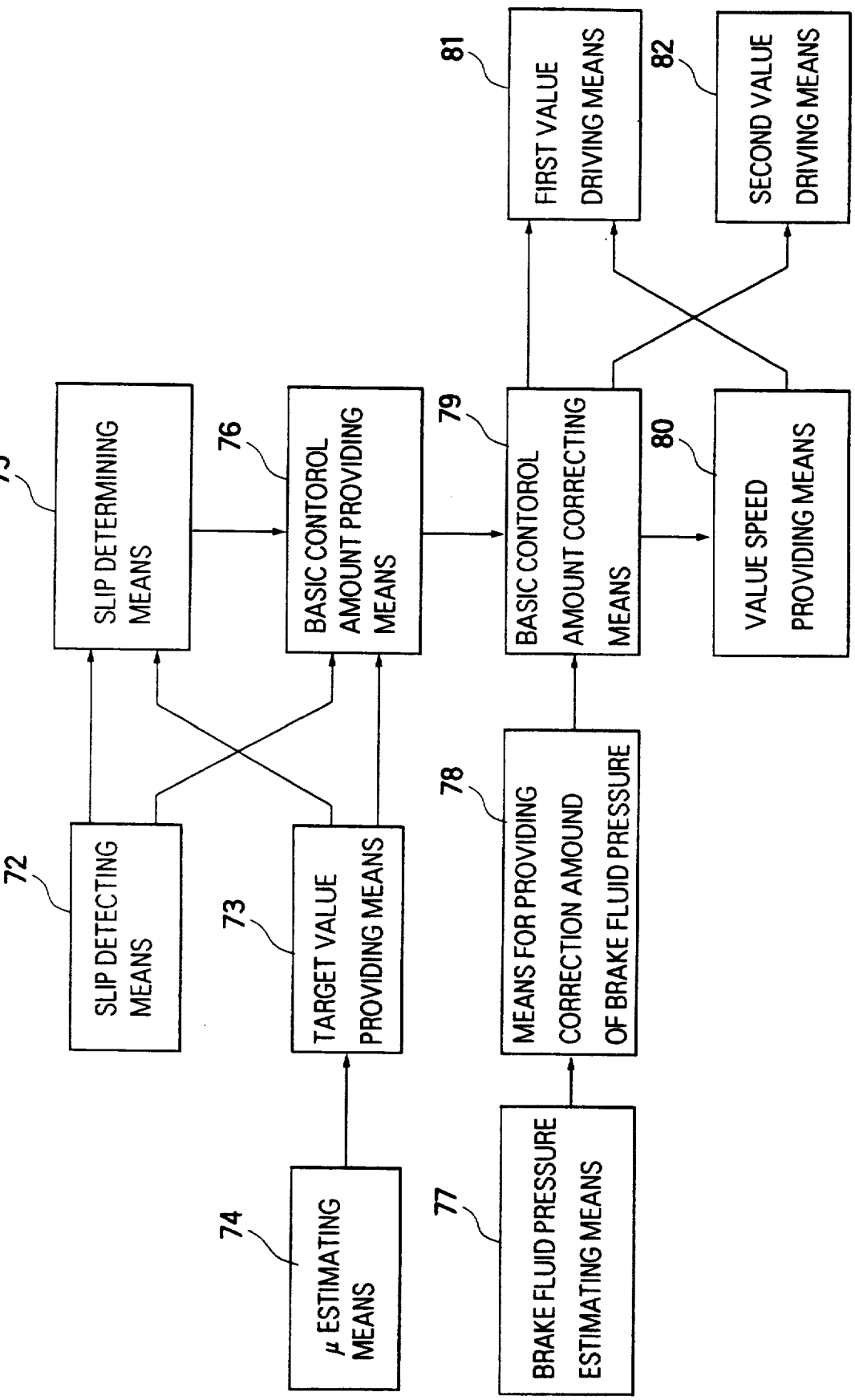
FIG. 2 is a block diagram of a slip control unit in a slip control system for a motor vehicle in accordance with the present invention.

Referring to FIG. 2, the slip control unit 70 is provided with a slip detecting means 72, a target value providing means 73 for providing a target slip valve or a threshold of slip value, a road surface friction coefficient $\mu$ estimating means 74, a slip determining means 75, a basic control amount providing means 76, a brake fluid pressure estimating means 77 for estimating respective brake fluid pressures in the driven wheels 2RR, 2RL, a means 78 for providing a correction amount of brake fluid pressure by converting brake fluid pressure into throttle opening, a basic control amount correcting means 79, a valve speed providing means 80 for providing a valve speed of the sub throttle valve 45, a first valve driving means 81 for driving an actuator 44, and a second valve driving means 82 for driving valves 32, 34, 36A, 36B, 37A and 37B.

Slip Detecting Means 72

Slip values in the driven wheels are detected by using the signals sent from the wheel rotation speed sensors 66FR, 66FL, 66RR and 66RL. Namely, the slip detecting means 72 detects the slip value S by subtracting the wheel rotation speed of the nondriven wheel from the wheel rotation speed of the driven wheel. In detecting the slip value S, the larger one of the driven wheel rotation speeds in the right and left driven wheels are employed as the driven wheel rotation speed, and the average of the nondriven wheel rotation speeds in the nondriven wheels are employed as the nondriven wheel rotation speed in the engine control. On the other hand, in the brake control, the same value as that in the engine control is employed as the nondriven wheel rotation speed, and respective driven wheel rotation speeds are employed so that respective brake fluid pressures in the driven wheels are controlled independently each other.

Target Value Providing Means 73

Figure 3:
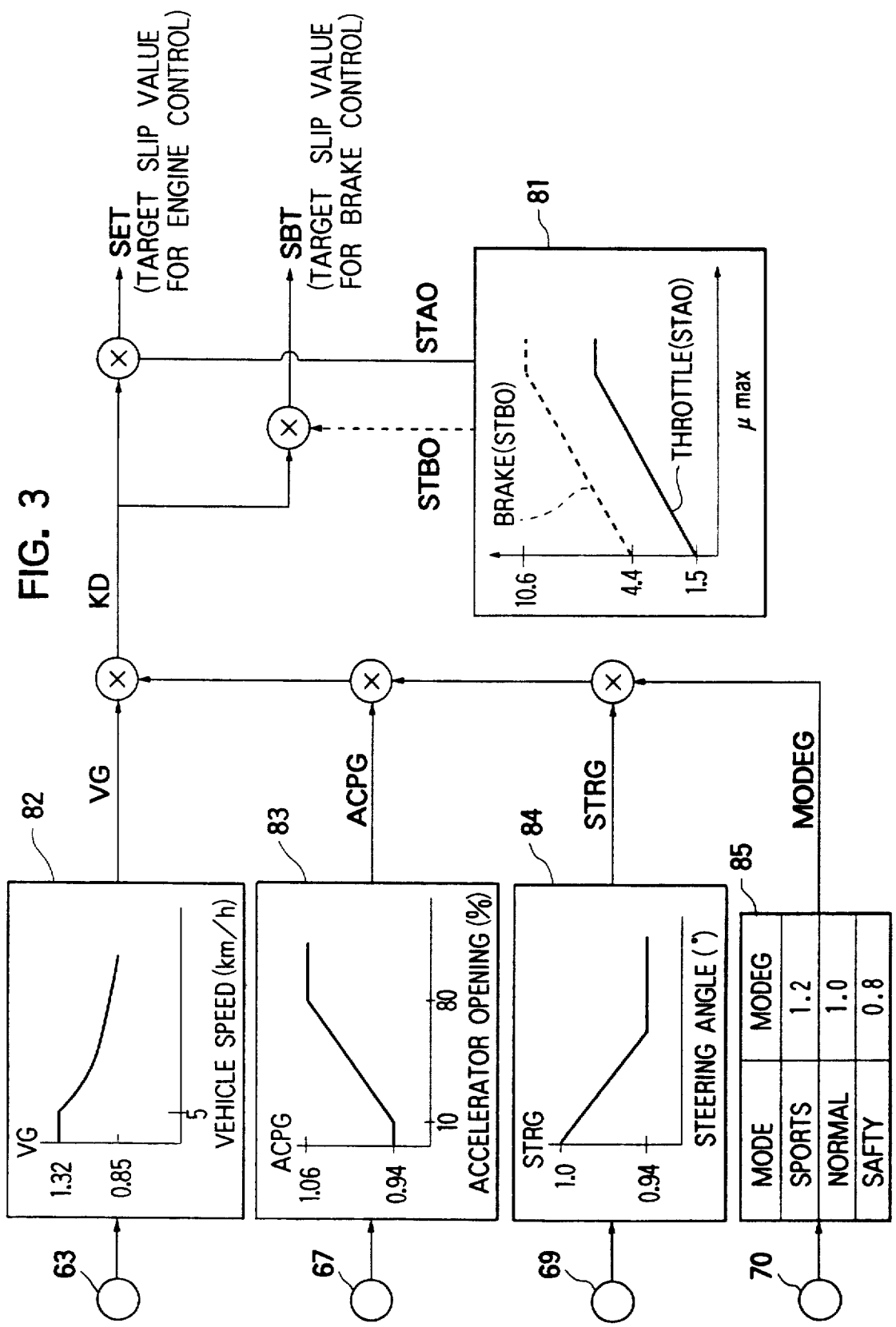
FIG. 3 is a block diagram showing a circuit for determining respective target slip values for the brake control and the engine control.

FIG. 3 is a block diagram showing a circuit for determining a target slip value SET for the engine control and a target slip value SB for the brake control. These target slip values SET, SBT are determined by parameters such as a vehicle speed, an accelerator operational amount, a steering angle of the steering wheel, a mode selected by the manual selection switch 71 and road surface friction coefficient $\mu$. The target slip value SBT for the brake control is greater than the target slip value SET for the engine control.

Referring to FIG. 3, a basic value STAO of the target slip value SET and a basic value STBO of the target slip value SBT are stored respectively in a map 81 whose parameter is the road surface friction coefficient $\mu$. In the map 81, the larger the friction coefficient $\mu$ becomes, the larger the both of STAO and STBO becomes, where STBO is greater than STAO. The target slip values SET and SBT are obtained respectively by multiplying the basic values STAO, STBO by a correction gain KD.

The correction gain KD is obtained by multiplying a gain coefficient VG by gain coefficients ACPG, STRG and MODEG. The gain coefficient VG is provided so as to obtain the stability of the vehicle in accordance with the increase of the vehicle speed and is given by a map 82 as a function of the vehicle speed. The gain coefficient ACPG is provided so as to obtain the driving force in accordance with the acceleration demand of the driver and is given by a map 83 as a function of the accelerator opening. The gain coefficient STRG is provided so as to obtain the stability of the vehicle in the steering operation and is given by a map 84 as a function of the steering angle. The gain coefficient MODEG is given by a table 85 and is manually selected from three modes i.e. SPORTS MODE, NORMAL MODE and SAFETY MODE by the driver.

Figure 4:
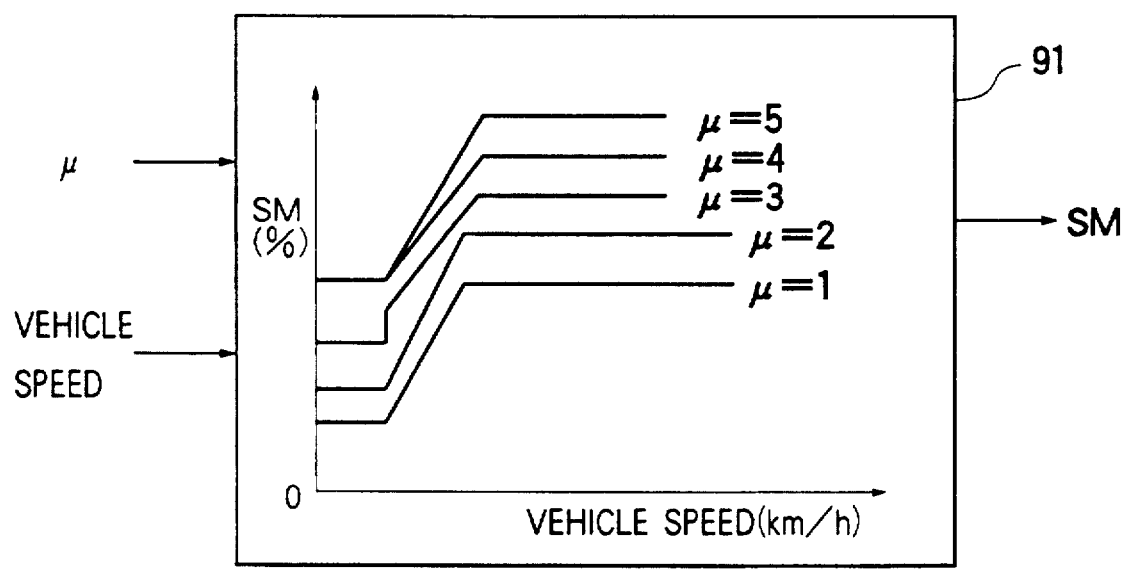
FIG. 4 is a block diagram showing a map for determining a lower limit control value SM in the slip control.

Referring to FIG. 4, the lower limit control value SM of the throttle opening is stored in a map 91 whose parameters are vehicle speed and road surface friction coefficient $\mu$. The friction coefficient $\mu$ varies from 1 to 5 where the smallest is equal to 1 and the largest is equal to 5.

$\mu$ Estimating Means 74

The road surface friction coefficient $\mu$ which is a friction coefficient between the road surface and the wheel is determined based on the vehicle speed Vr and the vehicle acceleration VG.

The vehicle acceleration VG is determined by using a timer A counting a time every 100 msec and a timer B counting a time every 500 msec. Namely, by using an following equation (1) the vehicle acceleration VG is determined every 100 msec based on the difference between the present vehicle speed and the 100 msec previous vehicle speed in which the larger wheel rotation speed of the front wheels 2FR, 2FL is employed as the vehicle speed whose unit is km/h, when the vehicle acceleration has not been developed enough or from the starting point of the slip control operation to a time at which 500 msec has passed from the starting point of the slip control operation. When the vehicle acceleration has been developed enough or after 500 msec has passed from the starting point of the slip control operation, the vehicle acceleration VG is determined every 100 msec based on the difference between the present vehicle speed and the 500 msec previous vehicle speed by using a following equation (2)

$$VG = Gk1 * \{Vr(k) - Vr(k-100)\} \tag{1}$$

$$VG = Gk2 * \{Vr(k) \ Vr(k-500)\} \tag{2}$$

where Gk1 and Gk2 are respectively coefficients, and Vr(k), Vr(k−100) and Vr(k-500) are respectively vehicle speeds at a present time, 100 msec previous time and 500 msec previous time.

Then the road surface friction coefficient μ is finally determined based on the above-mentioned vehicle acceleration VG and the vehicle speed Vr by using Table 1.

TABLE 1

| Vr | VG |  |  |  |  |  |  |  |  |
|---|---|---|---|---|---|---|---|---|---|
| | 0.00 | 0.05 | 0.10 | 0.15 | 0.20 | 0.25 | 0.30 | 0.35 | 0.40 |
| 000 | 1.0 | 1.0 | 2.0 | 2.0 | 3.0 | 3.0 | 4.0 | 4.0 | 5.0 |
| 020 | 1.0 | 1.0 | 2.0 | 2.0 | 3.0 | 4.0 | 4.0 | 5.0 | 5.0 |
| 040 | 1.0 | 1.0 | 2.0 | 3.0 | 3.0 | 4.0 | 4.0 | 5.0 | 5.0 |
| 060 | 1.0 | 1.0 | 2.0 | 3.0 | 4.0 | 4.0 | 5.0 | 5.0 | 5.0 |
| 080 | 1.0 | 1.0 | 2.0 | 3.0 | 4.0 | 5.0 | 5.0 | 5.0 | 5.0 |
| 100 | 1.0 | 1.0 | 2.0 | 4.0 | 4.0 | 5.0 | 5.0 | 5.0 | 5.0 |
| 120 | 1.0 | 2.0 | 3.0 | 4.0 | 5.0 | 5.0 | 5.0 | 5.0 | 5.0 |
| 140 | 1.0 | 2.0 | 3.0 | 5.0 | 5.0 | 5.0 | 5.0 | 5.0 | 5.0 |

Slip Determining Means 75

The slip determining means 75 employs the slip value S detected by the slip detecting means 72 and the target slip values SET, SBT. The slip determining means 75 sets a control flag as F=1 which means the engine control operation should be carried out where the slip value S is greater than SET, and sets the control flag as F=0 where the condition of the slip value S being equal to or less than SET has continued for a predetermined time. On the other hand, the slip determining means 75 determines that the brake control is necessary to be carried out when the slip value S is greater than SBT.

Basic Control Amount Providing Means 76

The basic control amount providing means 76 provides throttle opening control amount in the sub throttle valve 45 in the engine control and brake fluid pressure control amount in the brake control. Namely, the throttle opening control amount in the sub throttle valve 45 is provided as follows. First, a basic control amount T of the throttle opening is provided by using Table 2 whose parameters are the difference EN between the slip value S and the target slip value SET and the differential rate DEN of the differential EN. The difference EN is obtained by the following equation (3).

$$EN = S - SET \tag{3}$$

TABLE 2

|  | DEN | | | | | | |
|---|---|---|---|---|---|---|---|
|  | (−) | | | 0 | | (+) | |
| (−) | PB | PB | PB | PB | PM | ZO | ZO |
|  | PM | PM | PM | PM | PS | ZO | ZO |
| EN | PM | PM | PM | PS | ZO | ZO | ZO |
| 0 | PS | PS | PS | ZO | ZO | ZO | ZO |
|  | ZO | ZO | ZO | ZO | NS | NS | NS |
|  | ZO | ZO | NS | NM | NM | NM | NM |
| (+) | ZO | ZO | NM | NB | NB | NB | NB |

In Table 2, Z0 means that the throttle opening is maintained, N means that the throttle opening is decreased or the sub throttle valve is closed, and P means that the throttle opening is increased or the sub throttle valve is opened. Further, suffix letters S, M, B to N or P mean respectively control amount in the throttle opening, and the suffix letters S, M, B mean respectively small amount, medium amount and big amount.

Second, a correction coefficient TG of the throttle opening is obtained by using Table 3 whose parameters are throttle opening (0%-100%) and engine rotation speed NER. Finally, a control amount Tn (=T*TG) of the throttle opening is provided.

TABLE 3

|  |  | THROTTLE OPENING | |  |
|---|---|---|---|---|
|  | 0% |  |  | 100% |
| NER < 3000 rpm | 1.0 |  | 2.0 |  3.0 |
| 3000 rpm ≦ NER < 5000 rpm | 1.0 |  2.0 |  3.0 |  |
| 5000 rpm ≦ NER | 1.0 | 2.0 |  3.0 |  |

In Table 3, the smaller the throttle opening is or the smaller the engine rotation speed is, the smaller value the correction coefficient TG has, since the engine makes quick response under such conditions. The correction coefficient TG of the throttle opening may employ only the throttle opening in Table 3.

In the same manner, the control amount of the brake fluid pressure can be obtained.

Brake Fluid Pressure Estimating Means 77

The brake fluid pressure estimating means 77 estimates the brake fluid pressures in the respective driven wheels 2RR, 2RL based on the signals from the brake fluid pressure sensors 64, 65 detecting the brake fluid pressures in the driven wheels.

In stead of employing the brake fluid pressure sensors 64, 65, the brake fluid pressure may be estimated by detecting time periods of the increasing pressure and decreasing pressure operations in the respective valves 36A, 36B, 37A and 37B and then obtaining the difference between such time periods.

Means for Providing Correction Amount of Brake Fluid Pressure 78

The means for providing correction amount of brake fluid pressure 78 provides a correction amount TB of the brake fluid pressure by converting the lower one of the brake fluid pressures in the driven wheels detected by the brake fluid pressure estimating means 77 into the engine output by using a following equation (4)

$$TB = K * min(PL, PR) \qquad (4)$$

where K is a converting coefficient, and min (PL, PR) means the lower one of the brake fluid pressures in the driven wheels.

Basic Control Amount Correction Means 79

The basic control amount correction means 79 provides a final control amount Tn of the throttle opening by subtracting the correction amount TB of the brake fluid pressure provided by the means for providing correction amount of brake fluid pressure 78 from the basic control amount T of the throttle opening provided by the basic control amount providing means 76. That is, the final control amount Tn of the throttle opening is provided by using a following equation (5)

$$Tn = (T - TB)TG \qquad (5)$$

Valve Speed Providing Means 80

The valve speed providing means 80 provides a valve operational speed (unit; %/sec) of the sub throttle valve 45 based on the control amount Tn of the throttle opening provided by the basic control amount correction means 79 by using Table 4. The condition of the sub throttle 45 being opened fully corresponds to 100%.

TABLE 4

| CONTROL AMOUNT | NB | NM | NS | ZO | PS | PM | PB |
|---|---|---|---|---|---|---|---|
| SPEED | −10 | −5 | −2 | 0 | +2 | +5 | +8 |

In Table 4, the valve operational speed is provided in the large control amount region such as NB, PB so that the valve speed in NB is larger than that in PB, and provided in the small control amount region such as NM, NS, PS and PM so that the opening speed in PS, PM and the closing speed in NS, NM are equal respectively under the both control amounts being equal each other.

Driving Means 81 and 82

The first valve driving means 81 sends a driving signal to the actuator 44 which drives the sub throttle valve 45 at the speed provided by the valve speed providing means 80 so that the control amount Tn of the throttle opening provided by the basic control amount correction means 79 is obtained.

The second driving means 82 sends driving signals to the valves 32, 34, 36A, 36B, 37A and 37B so that control amount of the brake fluid pressure provided by the basic control amount correction means 79 is obtained.

Figure 5:
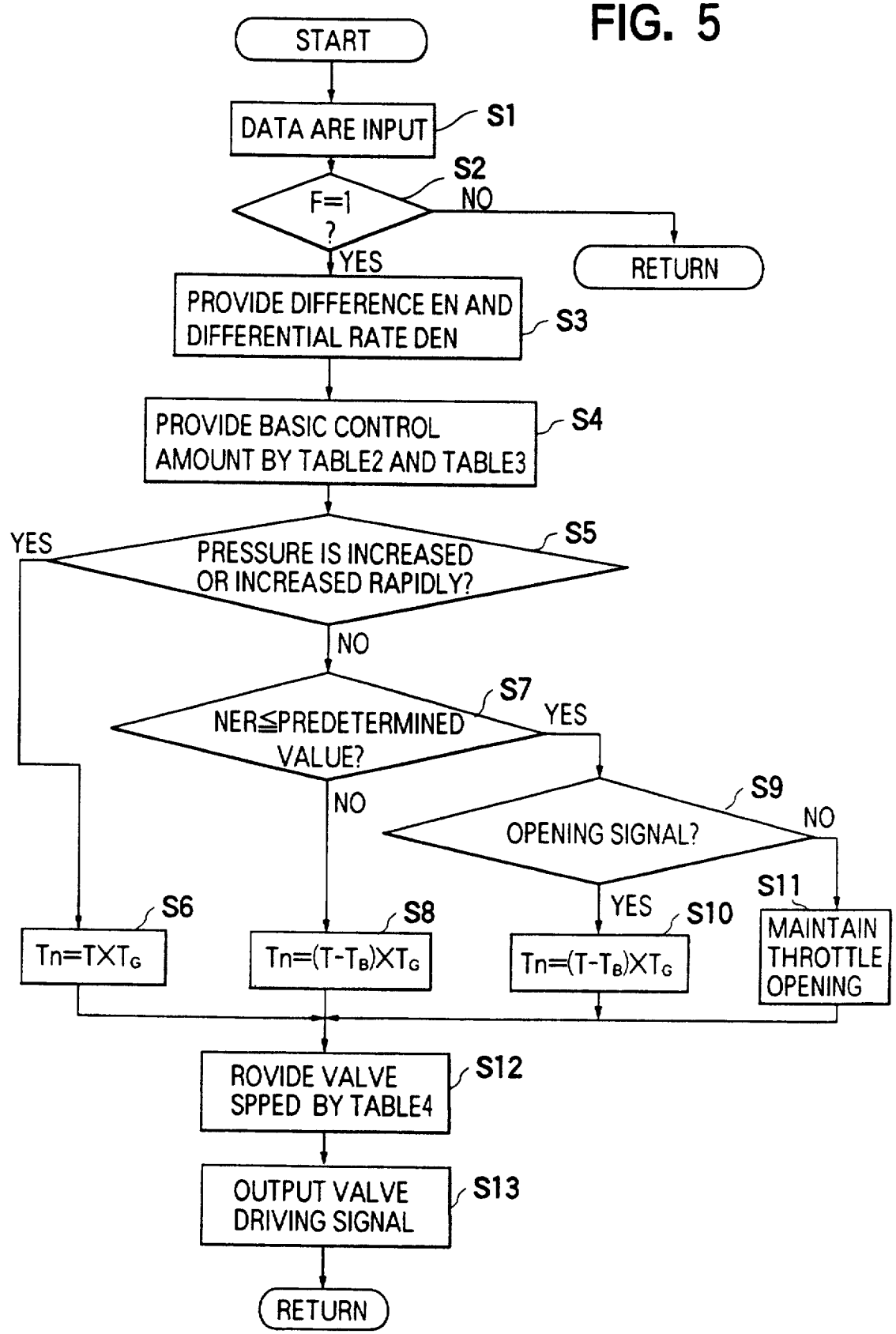
FIG. 5 is a flow chart showing an engine control in accordance with the present invention.

Referring to FIG. 5, the content of the control operation of the sub throttle valve 45 will be explained below. S in FIG. 5 indicates a step.

Various data are input in S1, and then it is determined whether or not the slip control is being carried out (F=1) in S2. When the slip control is being carried out, the difference EN and the differential rate DEN of the difference EN are provided in S3. In S4, the control amount Tn (=T*TG) of the throttle opening in the sub throttle valve 45 is provided based on the above-mentioned EN and DEN by using Table 1 and Table 2.

Next, in S5, it is determined whether or not the brake fluid pressure is in phase zero where the brake fluid pressure is increased or increased rapidly.

Figure 6:
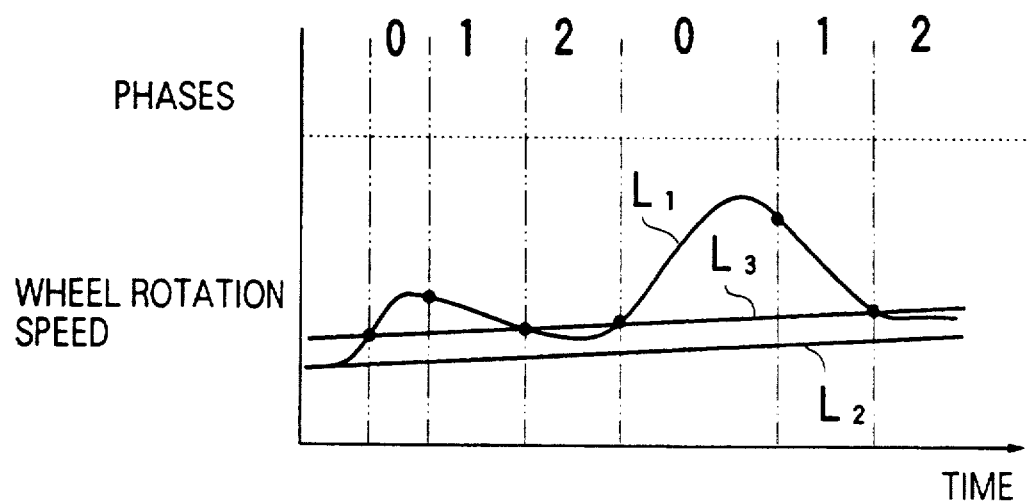
FIG. 6 is a time chart showing a wheel rotation speed for judging phases.
Figure 7:
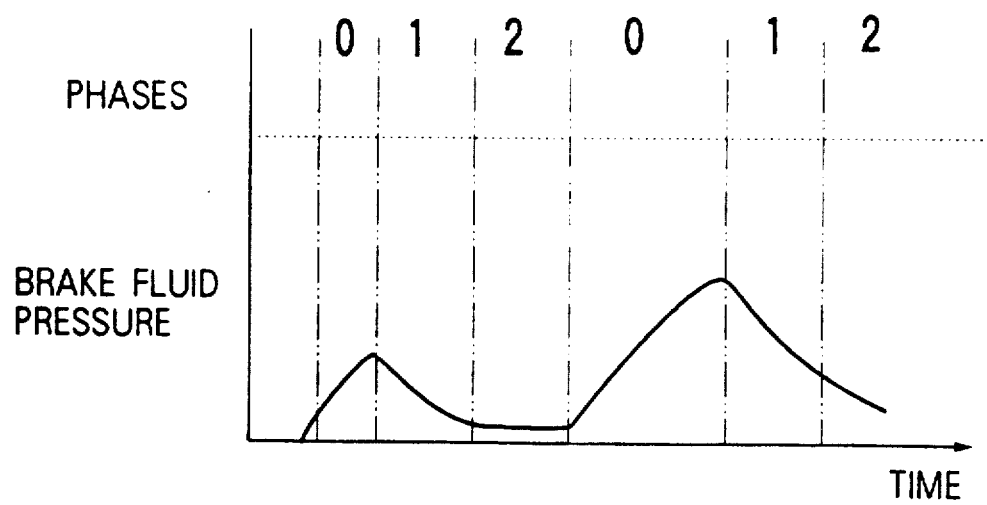
FIG. 7 is a time chart showing brake fluid pressure for judging phases.

How to determine respective phases of the brake fluid pressures is shown in FIGS. 6 and 7. In FIG. 6, $L_1$ shows a wheel rotation speed of the driving wheel, $L_2$ shows an average wheel rotation speed both of the nondriven wheels, and $L_3$ shows a target slip value SBT. FIG. 7 shows brake fluid pressure corresponding to the wheel rotation speed in FIG. 6. The brake fluid pressure is increased or increased rapidly in phase 0 in accordance with the slip value which is increasing, is decreased in phase 1 in accordance with the slip value which is decreasing, and is maintained in phase 2 in accordance with the slip value which is less than the target slip value SBT.

When it is determined that the brake fluid pressure in the driven wheel is in the phase 0 in S5, the control amount Tn (=T*TG) of the throttle opening is provided in S6 in which the correction amount TB of the brake fluid pressure is not subtracted from the basic control amount T of the throttle opening. If the control amount of the throttle opening is corrected with the correction amount TB of the brake fluid pressure when the brake fluid pressure is in the phase 0 in which the brake fluid pressure is increased or increased rapidly, the acceleration ability of the vehicle is decreased since the sub throttle valve 45 is closed too much. There fore, in order to prohibit above problem on the acceleration ability, the control amount Tn is provided as the above-mentioned in S6.

When it is determined that the brake fluid pressure in the driven wheel is in the phase 0 in S5, the procedure proceeds to S7 in which it is determined whether or not the engine rotation number NER is less than or equal to a predetermined value. The predetermined value is provided as a lower limit value of the engine rotation number so that the engine stall and a decrease in acceleration ability are prevented and the slip control can be carried out. The predetermined value is obtained by Table 5 one of whose parameters is the sum of the average of the nondriven wheel rotation speeds and the basic value STAO for the engine control, and the other of its parameters is gear positions.

TABLE 5

| | NON DRIVEN WHEEL SPEED + STAO (km/h) | | | | | | | | | | |
|---|---|---|---|---|---|---|---|---|---|---|---|
| | 0 | 10 | 20 | 30 | 40 | 50 | 60 | 70 | 80 | 90 | 100 |
| GEAR POSITION | | | | | | | | | | | |
| 1 | 700 | 1500 | 2500 | 3500 | 4500 | 5500 | 3500 | 7500 | 8000 | 8000 | 8000 |
| 2 | 600 | 1200 | 1700 | 2200 | 2700 | 3200 | 3700 | 4200 | 4700 | 5200 | 5700 |
| 3 | 600 | 1000 | 1500 | 2000 | 2500 | 3000 | 3500 | 4000 | 4500 | 5000 | 5500 |
| 4 | 550 | 700 | 1200 | 1700 | 2200 | 2700 | 3200 | 3700 | 4200 | 4700 | 5200 |

When it is determined that the engine rotation number NER is not less than or equal to the predetermined value in S7, the procedure proceeds to S8 in which the control amount Tn (=(T−TB)*TG) of the throttle opening provided by the basic control amount correction means 79 is provided. Namely, in S8, the lower one of the brake fluid pressures in the right and left driving wheels is converted into corresponding engine output, and the throttle opening amount TB corresponding to the converted engine output is subtracted from the basic control amount T of the throttle opening. As a result, one portion of the load of the brake is transmitted to the engine, and therefore the load of the brake can be decreased. Further, since the lower one of the brake fluid pressures in the right and left driven wheels is converted into the engine output, enough driving torque in the driven wheels can be obtained so that the vehicle can travel with no serious problem even if the vehicle is running on a so called split road while the slip control is being carried out. As a result, good starting ability and acceleration ability can be obtained under such conditions. On the other hand, since the difference between the brake fluid pressures in the right and left driven wheels is relatively small when the vehicle is running on the low $\mu$ road whose right and left sides have the same low $\mu$, there is no specific problem even if lower one of the brake fluid pressures in the right and left driven wheels is employed.

When it is determined that the engine rotation number NER is less than or equal to the predetermined value in S7, the procedure proceeds to S9 in which it is determined whether or not the signal for throttle opening is an opening signal by which the sub throttle valve 45 is opened. When it is determined that the signal is an opening signal, the procedure proceeds to S10 in which the control amount Tn (=(T−TB)*TG) of the throttle opening is provided in the same way as in S8 even if the engine rotation number NER is less than or equal to the predetermined value. When the engine rotation number NER is less than or equal to the predetermined value and the signal is not an opening signal, the procedure proceeds to S11 in which the throttle opening is maintained at the present condition.

Next, the procedure proceeds to S12 in which the valve operational speed is determined by using Table 4 based on the control amounts provided in S6, S8, S10 and S11. Then, in S13, the valve driving signal is output by which the sub throttle valve 45 is driven.

Content of the Slip Control

Figure 8:
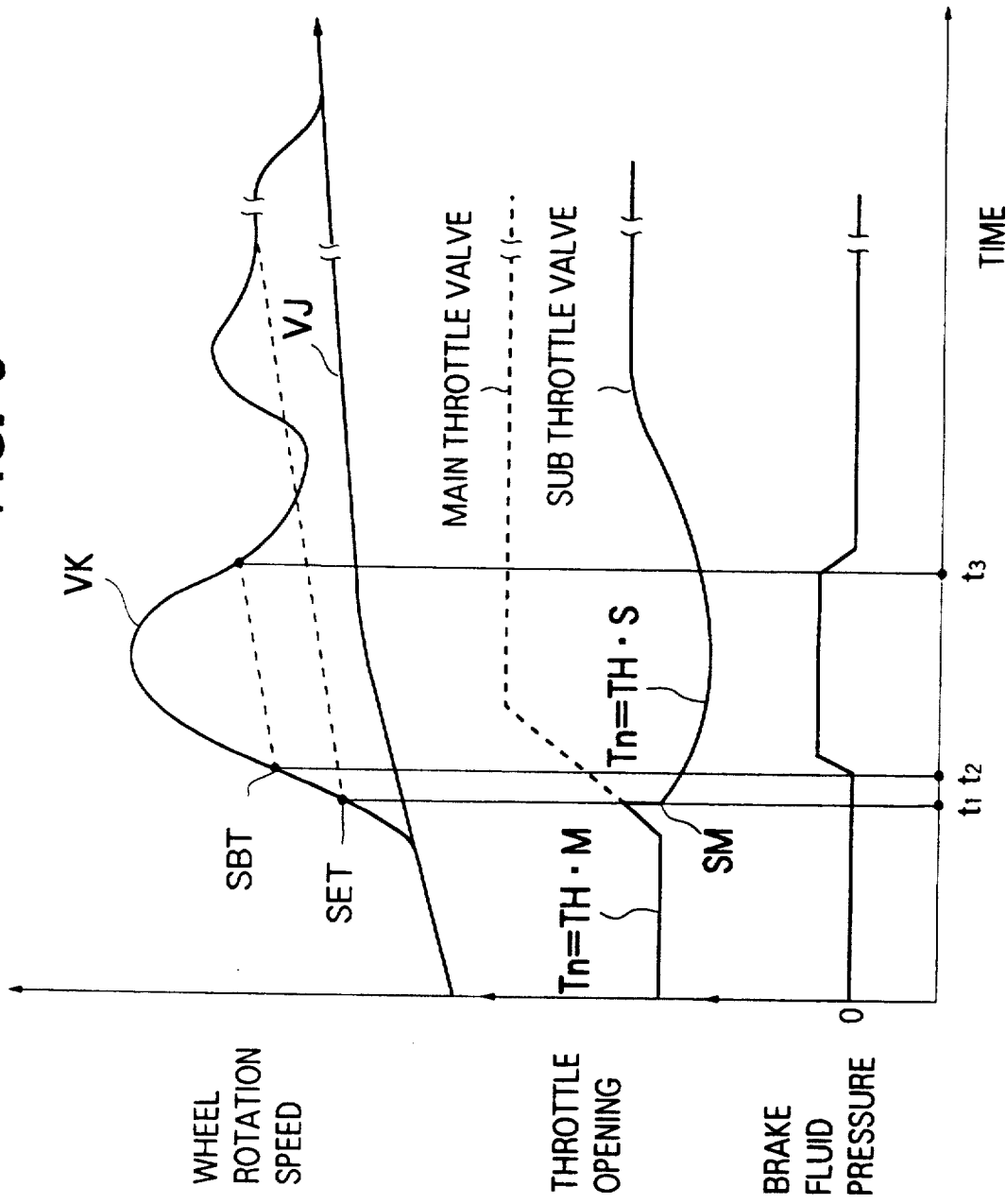
FIG. 8 is a time chart showing a slip control.

Referring to FIG. 8, there will be described the content of the slip control carried out by the slip control unit 70. Here, the slip control includes the engine control and the brake control.

Before the time $T_1$, the slip of the driving wheel is so small so that the engine control is not carried out. At this time, the sub throttle valve 45 is fully opened and the throttle opening Tn, which is a composite opening of the main throttle valve 43 and the sub throttle valve 45 and is determined by whichever throttle valve is open least, is operated by the main throttle valve opening TH*M which is determined by an operational amount of the acceleration pedal 42.

At the time $t_1$, when the slip value of the driving wheel increases up to the target slip value SET for the engine control, the engine control operation for the slip control is started in the embodiment of the invention. At the instant of $t_1$, the actuator 44 controls the sub throttle valve 45 by a feedforward control so that the throttle opening Tn is dropped down to the lower limit control value SM. After the throttle opening Tn is dropped down to the lower limit control value SM, the throttle opening of the sub throttle valve 45 is controlled by a feedback control so that the slip value of the driving wheel becomes less than the target slip value SET for the engine control. After the engine control for the slip control is started, the throttle opening Tn becomes equal to the sub throttle opening TH*S of the sub throttle valve 45.

At the time $t_2$, when the slip value of the driven wheel becomes greater than the target slip value SBT for the brake control, the brake fluid pressure is supplied to the brakes 21RR, 21RL of the driven wheels, and as a result the slip control employing both the engine control and the brake control has been started.

At the time $t_3$, when the slip value of the driven wheel becomes less than the target slip value SBT for the brake control, the brake fluid pressure is reduced to zero and the brake control is finished. Meanwhile, the engine control is still being carried out.

Hereinafter, the engine control for the slip control will be described in detail. When the throttle opening is dropped down to the lower limit control value SM at the time $t_1$, the slip value of the driven wheel is still increasing rapidly. Since the difference EN and the differential rate DEN of EN respectively have large positive values at this moment, the control amount NB for example is provided. As a result, the sub throttle valve 45 is closed at a high speed. Then, the slip value of the driven wheel becomes greater than peak of the slip value thereof and approaches the target slip value SET for the engine control.

After this, the control amounts NM, NS and Z0 are respectively provided in order, and the throttle opening is maintained with the sub throttle valve being closed. When the slip value of the driving wheel becomes approximately equal to the target value SET, the control amount PS of the throttle opening is provided based on which the sub throttle valve 45 is controlled to be opened. Under the low control amount region such as NM, NS, Z0 and PS, the valve operational speed is relatively low. As a result, there is a small possibility that the slip value of the driven wheel will increases or decreases rapidly, and therefore the hunting phenomenon in the slip control can be prevented.

On the other hand, when the road surface friction coefficient $\mu$ increases for a time, the slip value of the driven wheel may become less than the target slip value SET or in some cases the control amount PB is provided. In this case, the operational valve speed in PB is less than that in NB. As a result, since the throttle opening is not rapidly opened too much, excessive slip of the driven wheel can be prevented after the friction coefficient $\mu$ has been changed to the lower one.

In the embodiment, the slip control is finished when the slip value of the driven wheel becomes less than the target slip value SET and the operational amount of the acceleration pedal becomes zero, the throttle opening of the main throttle valve becomes less than that of the sub throttle valve, or the brake pedal is operated.

The brake control is finished when the decrease of the brake fluid pressure has continued for a predetermined time. For example, one is counted when the brake fluid pressures in both driven wheels are decreased, the counted number is reset as zero when the brake fluid pressure is increased, and zero is counted when the brake fluid pressure is maintained or when the brake fluid pressure in one driven wheel is decreased. In this case, the predetermined numbers are counted, the brake control is finished.

The present invention has been described with reference to the preferred embodiments thereof which are intended to be illustrative rather than limiting. Various changes in modifications may be made without departing from the spirit and scope of the present invention in the following claims.

What is claimed is:

1. A slip control system for a motor vehicle controlling respective braking forces in right and left driven wheels and controlling an engine output by controlling a throttle opening of a throttle valve so that a slip value of the driven wheel becomes less than a target slip value, said system comprising:
   means for providing a basic control amount of the throttle opening based on the slip value of the driven wheel and the target slip value;
   means for detecting respective brake fluid pressures in the right and left driven wheels;
   means for converting the detected brake fluid pressure into an engine output;
   means for providing a correction control amount of the throttle opening by subtracting an amount of the throttle opening corresponding to the converted engine output from the basic control amount of the throttle opening; and
   means for driving the throttle valve by the basic control amount of the throttle opening when the brake fluid pressures in the right and left driven wheels are increased or increased rapidly, and driving the throttle valve by the correction control amount of the throttle opening when the brake fluid pressures in the right and left driven wheels are not increased or increased rapidly.

2. A slip control system according to claim 1, wherein said driving means drives the throttle valve by the correction control amount of the throttle opening when an engine rotation number is less than a predetermined value and a throttle opening signal is an opening signal.

3. A slip control system according to claim 1, wherein said driving means controls the throttle valve so as to maintain the throttle opening when an engine rotation number is less than a predetermined value and a throttle opening signal is not an opening signal.

4. A slip control system according to claim 1, wherein said basic control amount providing means provides the basic control amount of the throttle opening by using a correction coefficient whose parameter is the throttle opening.

5. A slip control system according to claim 1, wherein said basic control amount providing means provides the basic control amount of the throttle opening by using a correction coefficient whose parameters are the throttle opening and the engine rotation number.

6. A slip control system according to claim 1, wherein the system further comprises means for providing a valve speed of the throttle valve so that the larger the control amount of the throttle valve is, the higher the valve speed is, said driving means driving the throttle valve at the valve speed.

7. A slip control system according to claim 6, wherein said valve speed providing means provides the valve speed of the throttle valve in a region where the control amount of the throttle valve is large so that the valve speed in a closing operation is provided as a higher value than that in an opening operation.

8. A slip control system for a motor vehicle controlling respective braking forces in right and left driven wheels and controlling an engine output by controlling a throttle opening of a throttle valve so that a slip value of the driven wheel becomes less than a target slip value, said system comprising:
   means for providing a basic control amount of the throttle opening based on the slip value of the driven wheel and the target slip value;
   means for detecting respective brake fluid pressures in the right and left driven wheels;
   means for converting lower one of the detected brake fluid pressures in the right and left driven wheels into an engine output;
   means for providing a correction control amount of the throttle opening by subtracting an amount of the throttle opening corresponding to the converted engine output from the basic control amount of the throttle opening; and
   for driving the throttle valve by the correction control amount of the throttle opening.

9. A slip control system according to claim 8, wherein said basic control amount providing means provides the basic control amount of the throttle opening by using a correction coefficient whose parameter is the throttle opening.

10. A slip control system: according to claim 8, wherein said driving means drives the throttle valve by the correction control amount of the throttle opening when an engine rotation number is less than a predetermined valve and a throttle opening signal is an opening signal, and controls the throttle valve so as to maintain the throttle opening when the engine rotation number is less than the predetermined value and the throttle opening signal is not the opening signal.

* * * * *